United States Patent [19]

Chandra et al.

[11] 3,984,510
[45] Oct. 5, 1976

[54] RATIO CONTROLLED MIXING OF LIQUIDS

[75] Inventors: Rangasami Sarat Chandra; Kirby Lee Stone, both of Cincinnati, Ohio

[73] Assignee: Cincinnati Milacron, Inc., Cincinnati, Ohio

[22] Filed: June 13, 1975

[21] Appl. No.: 586,523

Related U.S. Application Data

[62] Division of Ser. No. 501,743, Aug. 29, 1974, Pat. No. 3,908,862.

[52] U.S. Cl................................ 264/40.1; 264/329
[51] Int. Cl.².......................................... B29G 3/00
[58] Field of Search......................... 264/37, 40, 329

[56] References Cited
UNITED STATES PATENTS

| | | | |
|---|---|---|---|
| 2,885,268 | 5/1959 | Breer | 264/329 X |
| 3,386,623 | 6/1968 | Berrill | 222/334 X |
| 3,390,813 | 7/1968 | Alderfer | 222/134 |
| 3,409,174 | 11/1968 | Radcliffe | 222/134 X |
| 3,693,946 | 9/1972 | Meritt | 264/40 X |
| 3,726,334 | 4/1973 | Sallberg | 425/145 X |

*Primary Examiner*—Richard R. Kucia
*Attorney, Agent, or Firm*—Daniel P. Worth

[57] ABSTRACT

Method for the controlled mixing of liquids in a predetermined ratio and is especially suitable for the dispensing of predetermined ratios of polyol and polyisocyanate liquids in the liquid injection molding of polyurethane articles. The ratio control is achieved by a master-slave relationship between at least two metering pumps of the plunger or piston type which are position coupled and inject on a common programmed velocity profile (in the master system), but with each system controlled by an automatic velocity feedback control loop (a closed loop system) wherein the reference signal into the slave automatic control system (typically the polyol system) is obtained in a suitable ratio from the master automatic control system (typically the polyisocyanate system). The method includes continuing to drive the metering pumps past the time that mixing is cut off.

6 Claims, 7 Drawing Figures

FIG.1

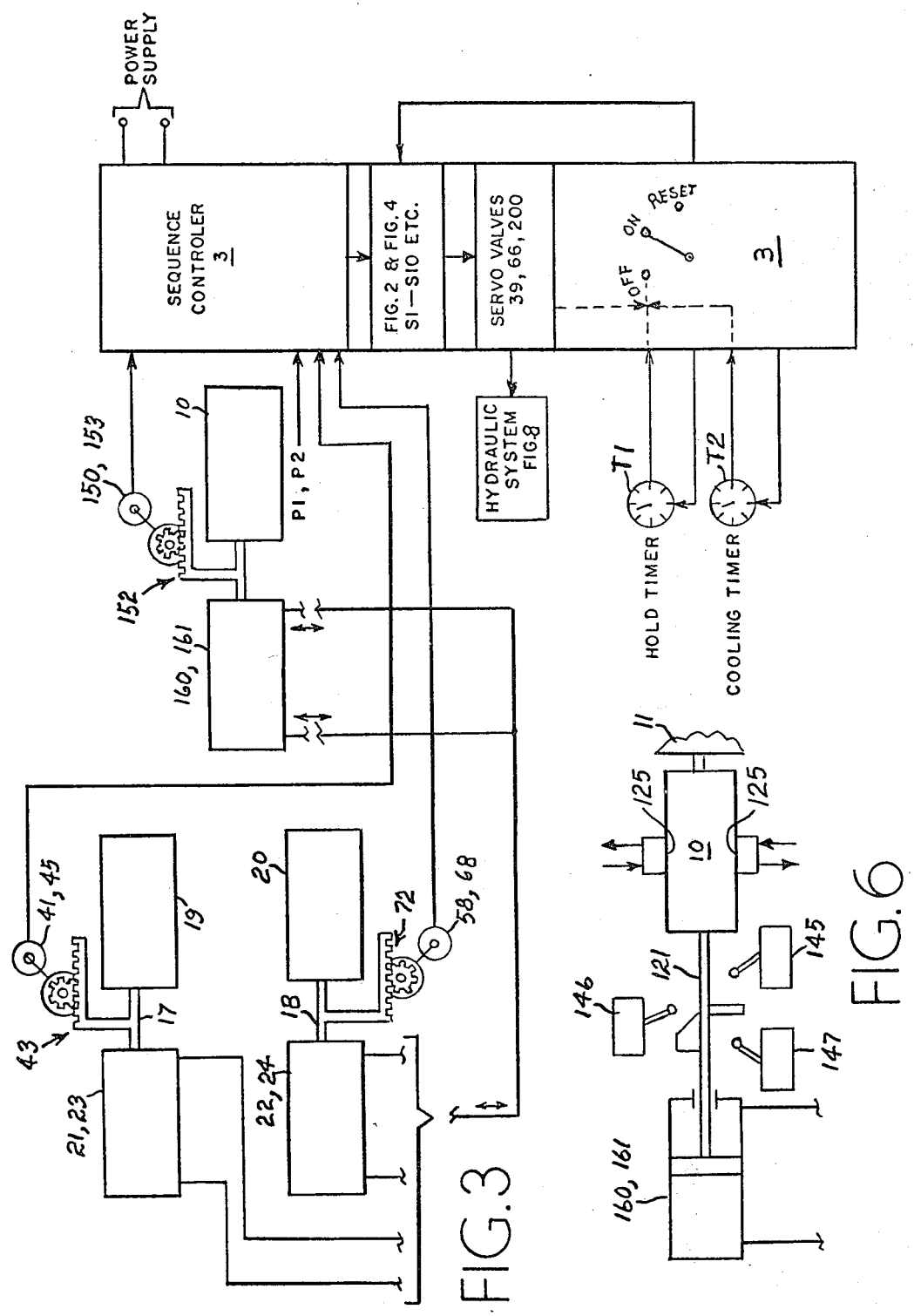

| SYSTEM PARAMETERS | SHOT PREP | PRE-PRESSURIZATION | INJECTION | HOLD | COOLING |
|---|---|---|---|---|---|
| BALL VALVE V1 | OPEN | | CLOSED | | OPEN |
| BALL VALVE V2 | OPEN | | CLOSED | | OPEN |
| BALL VALVE V3 | OPEN | | CLOSED | | OPEN |
| BALL VALVE V4 | OPEN | | CLOSED | | OPEN |
| SHOT POSITION 82 | ON | | OFF | | ON |
| SHOT POSITION 104 | ON | | OFF | | ON |
| INJ. TERMINATION POSITION 81 | OFF | | | ON | OFF |
| INJ. TERMINATION POSITION 103 | OFF | | | ON | OFF |
| MIX VALVE BOTTOM POSITION 145 | OFF | | | ON | OFF |
| MIX VALVE SHOT POSITION 146 | ON | | OFF | | ON |
| MIX VALVE INJ. POSITION 147 | OFF | | ON | | OFF |
| PRESSURE SWI. P1 | OFF | | ON | | OFF |
| PRESSURE SWI. P2 | OFF | | ON | | OFF |
| HOLD TIMER | OFF | | | ON | OFF |
| COOLING TIMER | ON | | OFF | | ON |

FIG. 4a

| SYSTEM PARAMETERS | SHOT PREP | PRE-PRESSURIZATION | INJECTION | HOLD | COOLING |
|---|---|---|---|---|---|
| SERVO SWITCH S1 | ON | OFF | | | ON |
| SERVO SWITCH S2 | ON | OFF | | | ON |
| SERVO SWITCH S3 | ON | ON | ON | OFF | ON |
| SERVO SWITCH S4A AND S4B | OFF | | ON | OFF | |
| SERVO SWITCH S5 | OFF | ON | ON | OFF | |
| SERVO SWITCH S6 | OFF | ON | ON | OFF | |
| SERVO SWITCH S7 | ON | OFF | | | ON |
| SERVO SWITCH S8 | OFF | | ON | OFF | |
| SERVO SWITCH S9 | ON | OFF | | | ON |
| SERVO SWITCH S10 | OFF | | ON | OFF | |

FIG. 4b

RATIO CONTROLLED MIXING OF LIQUIDS

This is a division of application Ser. No. 501,743, filed Aug. 29, 1974 which issued on Sept. 30, 1975 as U.S. Pat. No. 3,908,862.

SUMMARY AND BACKGROUND OF INVENTION

This invention relates to improvements in a method for the ratio controlled mixing of liquids. One aspect of the invention relates to a method using an electrical automatic control loop for each of at least two liquids arranged in a master-slave relationship between the control loops. An aspect of the invention is a method of automatic control using electrical feedback automatic control systems where the master system has a programmable velocity profile and provides input reference signals to each slave control system that are representative of reference velocity and the position of a movable mechanical element in the master system. An aspect is the method of continuing to feed liquids even after mixing has stopped. The invention has particular application to the feeding and mixing of reagents that include polyol and isocyanate in the liquid injection molding of articles made of polyurethane compositions in connection with which the present invention will now be described by way of example but not limitation.

Liquid feeding mixers having means to adjust the feed ratio of one or more liquids to another are known, as is taught in a large number of previously issued U.S. and foreign patents, of which U.S. Pat. Nos. 3,386,623 and 3,642,175 are generally representative. It is also known to feed such liquids using plunger or piston type metering pumps.

It is common practice in the prior art to feed the reagents for making polyurethane sequentially or one at a time into a mixing chamber. This, however, generates a number of difficulties such as requiring longer cycle time for molding operations and also requiring a longer shelf time or pot-life to avoid having the reagents set up in the mixing chamber. One of the features and advantages of the instant invention is to reduce cycle time by allowing the use of fast-reacting chemicals whereupon the cycle time can be substantially reduced.

The method hereof embraces feeding interreactable liquids from plural sources to a mixing chamber from when the mixed liquids are injected into a mold cavity and any associated runners and sprues (hereafter called cavity) for completion of reaction and curing comprising the steps of: providing first and second positive displacement expandable chamber liquid metering pumps; filling the chamber of each pump, respectively, with a predetermined quantity of liquid in excess of that moiety of said liquid required to fill said cavity with a reacting mixture from said mixing chamber; establishing an open path from the outlet of each pump to within said mixing chamber; feeding each respective liquid through its path and into said chamber from its respective pump until said moiety of each liquid has entered said mixing chamber; simultaneously ceasing said feeding and then diverting said excess of each liquid, respectively, to its source therefore and meanwhile injecting into said cavity all of the admixed liquids that have entered said mixing chamber.

Other objects, advantages and features will become apparent from a reading of the following specification in connection with the annexed drawings wherein:

FIG. 3 is a schematic diagram with elements from all Figs. to illustrate the sequencing and other automatic controls;

Figure 1:
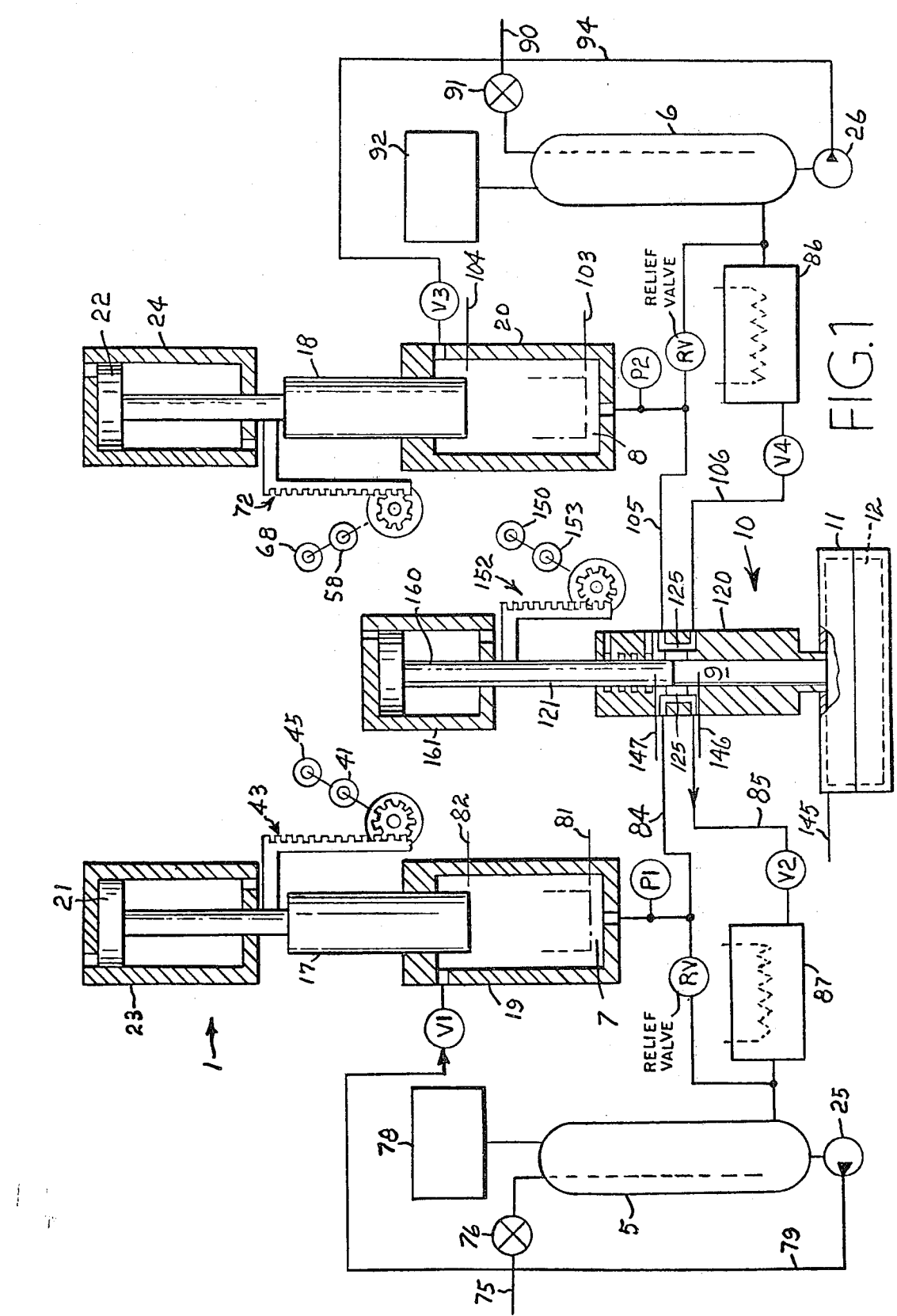
FIG. 1 is a schematic diagram of the overall system for handling and feeding liquids in a ratio.
Figure 2:
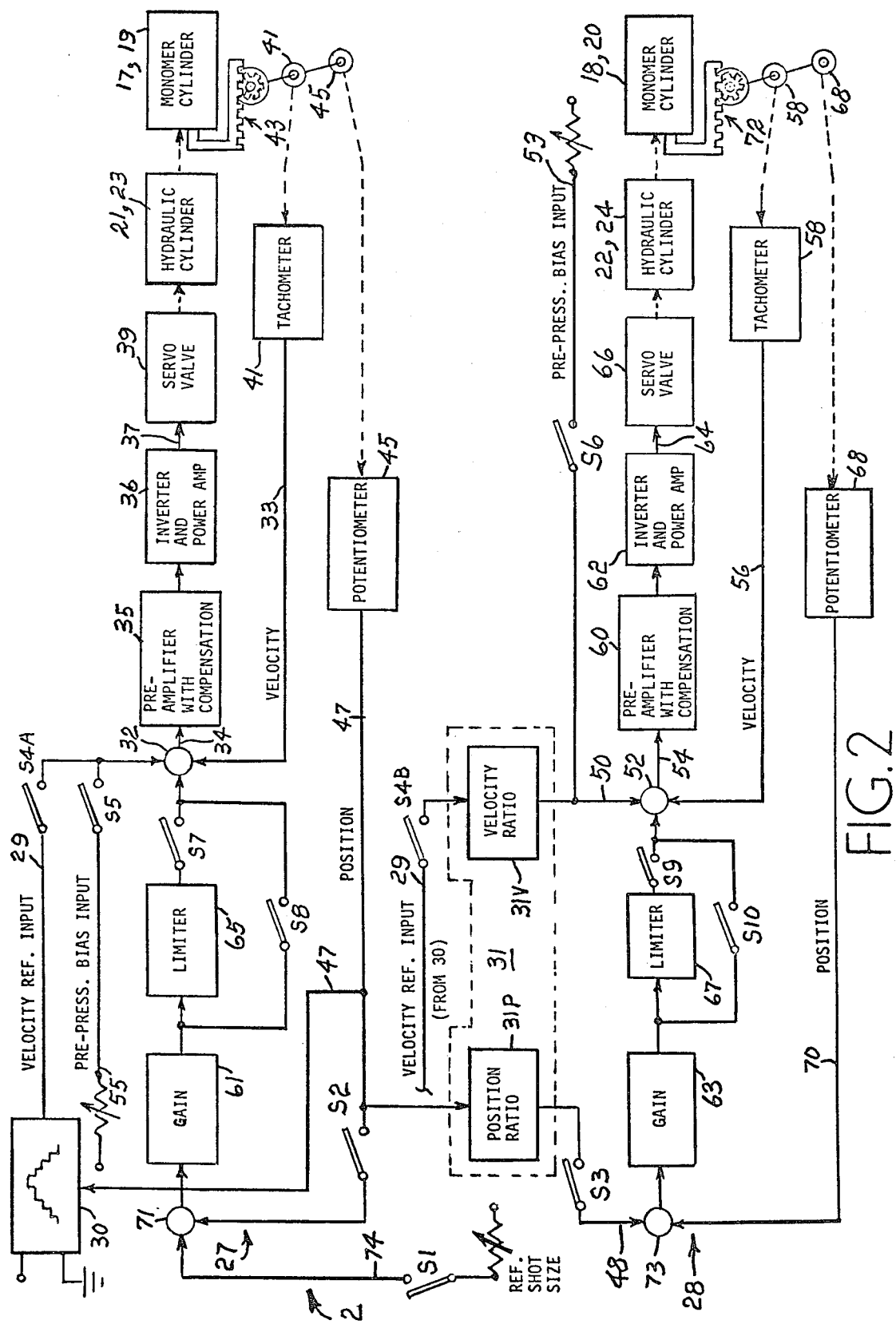
FIG. 2 is a schematic electrical control diagram explanatory of the position coupled programmable velocity controlled ratio feeding system.
Figure 5:
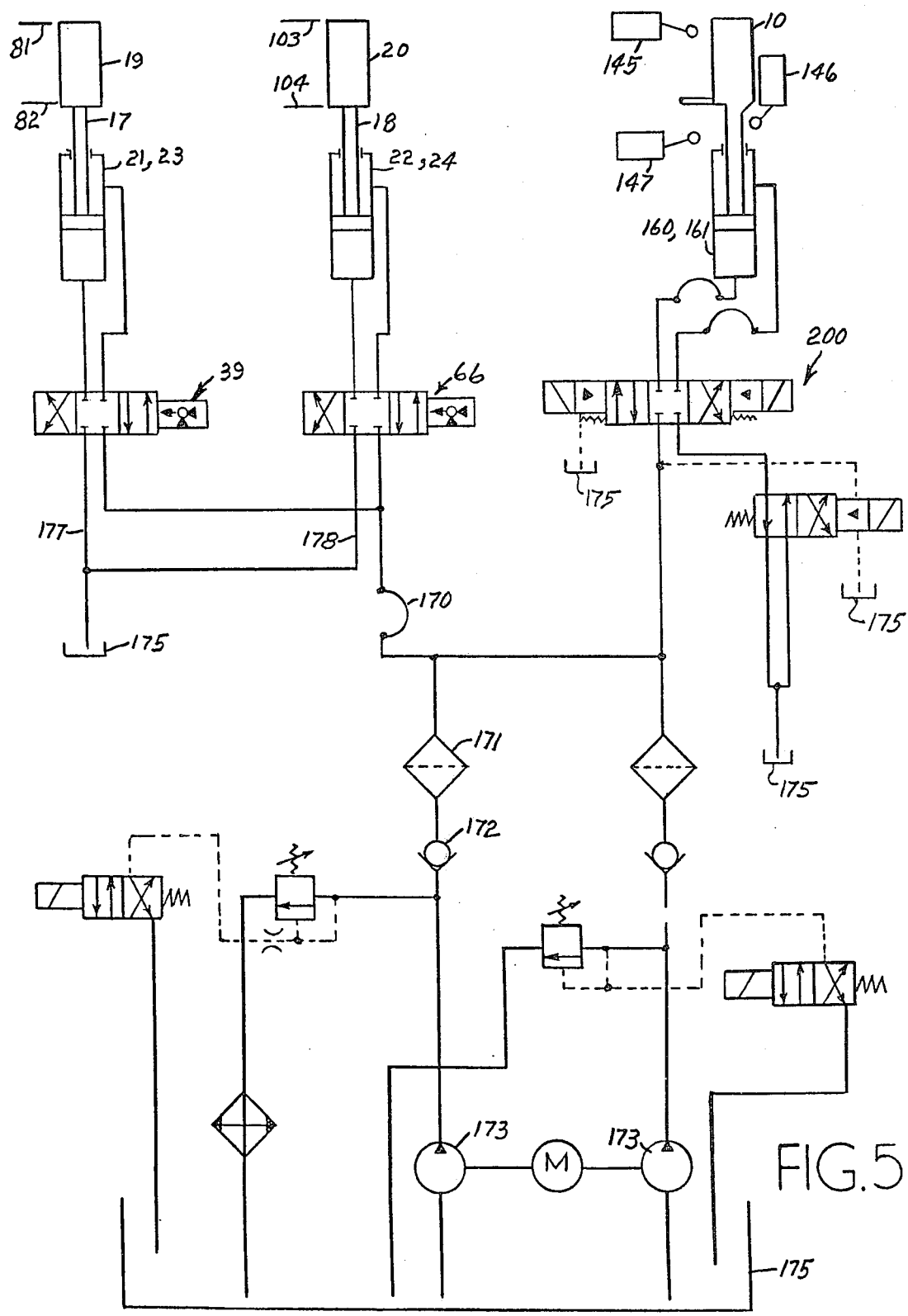

FIGS. 4a and 4b (collectively called FIG. 4 below) are timing charts explanatory of the operations of the apparatus illustrated schematically in FIGS. 1, 2 and 3;

FIG. 5 schematically illustrates a hydraulic system that is suitable; and

FIG. 6 schematically illustrates the mix head positioning system of FIGS. 1–3 with limit switches substituted for other position sensors and lugs etc. to operate said switches.

INTRODUCTION

The present invention is directed primarily to the automatic control system 2 illustrated in FIG. 2 as applied to the molding of polyurethane articles to control the metering, mixing and injection system 1 of FIG. 1. The sequencing of events and other overall automatic controls 3 for the FIG. 1 system are illustrated generally in FIGS. 3 and 4. The metering and mixing head details are shown in FIGS. 5, 6 and 7.

The FIG. 1 system feeds polyisocyanate and polyol from their respective reservoirs 5, 6 to individual metering chambers 7, 8 from whence they are removed to a chamber 9 in a mixing head 10 from which the mixture (after or during reaction) is injected directly into a mold 11. The reagents do not contact each other until they enter the mixing chamber 9 but once they have been mixed and partially reacted in chamber 9 they are injected into the mold 11, cured in wellknown fashion, and a thermoset product 12 is then recovered.

The system of FIG. 1 is particularly well adapted to what is called liquid injection molding which handles reagents that are capable of very fast reaction such as the polyisocyanate and polyol used to form the polyurethane that is injected into the mold. Reaction times in the mixing head 10 to form gels are the order of about three seconds, the curing time in the mold is on the order of about two minutes, and a typical cycle time for molding an article weighing 15 pounds is about 2 minutes.

The metering or variable volume chambers 7, 8 of FIG. 1 are controlled by the system of FIG. 2 to deliver a preselected ratio of reagents e.g., a weight ratio of polyisocyanate to polyol. Preferably each metering chamber is a positive displacement liquid feeding means and is mechanically constructed to include a plunger or piston 17, 18 operating within a cylinder 19, 20 through a swept volume of preselected but variable or adjustable magnitude: each plunger preferably is directly driven by a hydraulic piston 21, 22 which is moved within its respective cylinder 23, 24 responsive to the control systems of FIGS. 2 and 3. Preferably a single stroke of each metering plunger 17, 18 in its respective cylinder completely exhausts the reagents therefrom and delivers that quantity of reagent into the mixing chamber 9.

The system of FIG. 1 is designed to keep the two reagents, e.g. isocyanate and polyol, from any contact with each other until they are delivered into the mixing chamber. The reagents are recirculated through the conduit paths described below during those times that they are not being delivered into the respective metering or measuring chambers.

The operations sequence including sequential control of the valving of FIG. 1 is manipulated by the control systems of FIGS. 3, 4 and 8 to direct reagents at desired times to certain flow paths and/or to the metering cylinders and to cause delivery from such cylinders into the mixing chamber as will be further explained below. As will be explained in more detail below, the pumps 25, 26 operate continuously to feed an excess of each liquid to the chambers 7, 8 the excess being recirculated until such time as the valving and mixing head 10 are operated to shut off recirculation and conduct a mixing and injection program.

The present invention controls the ratio of liquids delivered from the metering chambers 7, 8 of FIG. 1 by using the master-slave control system 2 of FIG. 2. Preferably, the isocyanate control system 27 is the master and the polyol control system 28 is the slave. This arrangement can be reversed whereby the polyol becomes the master and the polyisocyanate the slave. The system of FIG. 2 allows both of the metering plungers 17, 18 to be advanced simultaneously whereby their respective liquids are fed simultaneously to the mixing head 10. However, the velocity or rate at which the liquids are forced out of their respective metering cylinders is programmed in accordance with the velocity desired at each position at each increment of distance that the master (isocyanate) metering plunger 17 arrives at. Therefore, it can be said that this is a position coupled programmable velocity controlled ratio injection system for multiple component liquid injection molding.

The control system of FIG. 2 has a programmed velocity means 30 to drive both metering systems in a controlled fashion, but simultaneously. This minimizes or eliminates lag and keeps both plungers 17, 18 approximately in phase during the time they are advancing and expelling liquids. The position coupling and velocity feedback loops, infra, allow slave correction on a lag basis whic has been found to be well within acceptable limits, yet the velocity coupling allows both to start and to continue to feed simultaneously.

The Ratio Controlling System of FIG. 2

This section is concerned with only the description of the ratio control system 2 of FIG. 2. Overall operation of the system is described in other sections of this specification. For convenience reference numbers are used for various signals and should also be understood as referring to the transmission means, normally wires for electrical signals and conduits for pneumatic and hydraulic signals.

The FIG. 2 system allows the operator to set in two adjustments: the velocity profile in the programmed velocity means 30 (patch panel) and the ratios in the ratio controller 31 which latter has two parts to be set: a position ratio 31P and a velocity ratio 31V.

The FIG. 2 system includes first and second feedback control system means 27, 28 (the master and slave portions) for controlling their respective feeding means 17, 19 and 18, 20.

Keep in mind that the system of FIG. 2 is enabled only during the time that the plungers 17, 18 in the metering cylinders are advancing and expelling the liquid therefrom. At other times the system of FIG. 2 is disabled. Other automatic control functions of the system as a whole are taken care of by other means 3 as in FIGS. 3, 4. Similarly, the FIG. 2 system is sequenced by manipulation of the switch means S1–S10 which are in turn enabled at the proper times by means described in connection with FIGS. 1, 3 and 4.

The patch panel 30 is used to set in the programmed velocity or velocity profile whereby the master metering plunger 17 velocity is programmed for each of a series of positions of the master metering plunger 17. In handling polyurethane reagents, preferably the velocity profile of the isocyanate metering plunger 17 would be established by the operator on the patch panel.

The output signal 29 from the patch panel 30 is a reference velocity (for each master or isocyanate plunger position) which is fed forward to the summing junction 32 for the master feedback control system 27 and is also applied to velocity input terminal of the ratio controller 31V. The summing junction 32 is part of the velocity feedback system and as is well-known algebraically sums signals applied thereto, in this case sums the reference and feedback velocity signals 29, 33, respectively, to provide a control signal 34 which is then fed forward through a preamplifier 35, and power amplifier 36 means as control signal 37 to a servo valve 39 for controlling the hydraulic fluid admitted to the hydraulic cylinder 23 driving the isocyanate cylinder plunger 17 of FIG. 1.

The signal 33 representing feedback velocity may advantageously be obtained in well-known fashion by a means for measuring the rate of liquid feeding such as by an electric tachometer 41 driven off the rack and pinion system 43 secured to the plunger 17. The rack and pinion 43 also drives position sensor potentiometer 45 which generates signal 47 representing master cylinder plunger 17 position.

The ratio controller 31 is adjustable for the isocyanate/polyol ratio and is used to operate the slave servo-system 28 for delivering polyol in a predetermined ratio to the isocyanate; each of the controller parts 31P, 31V is a computing amplifier designed for multiplying operations.

The master servo-system also has a position interlock which applies the signal 47 representing master cylinder plunger position to another input of the ratio controller and to the patch panel 30 — the latter so that master velocity is correlated with the position of the plunger.

The slave system 28 of FIG. 2 is operated from two input signals consisting 1. of a position locking input signal 48 obtained from the ratio controller 31P and representative of the product of:

polyisocyanates/polyol ratio (which is manually set in) times master plunger position representative Signal 47; and 2. velocity representative of signal 50 representing the product of reference velocity 29 (from patch panel) times the polyisocyanate/polyol ratio which produces the slave velocity feed forward input signal 50 which is fed to the summing junction 52 for the slave velocity feedback loop located on the input end of the slave control system.

Bias input voltages 53, 55 are provided from a power supply to their respective summing junctions 52, 32 during the prepressurizing and injection phases of the cycle (FIGS. 2, 4). Their purpose is to cause slow initial advance of the metering plungers 17, 18 so that pressure builds up in the lines leading from the metering cylinders to the mixing cylinder. The pressure builds up until pressure switches P1 and P2 turn off (FIGS. 1, 4) which event signals the end of prepressurizing and initiates the actual injection phases. The bias voltages are applied to the system by closing switches S5 and S6 during the prepressurizing and injection steps: S5 and S6 are open at other times. During the injection step switches S4A and S4B are closed to apply the velocity reference input to the system.

A slave velocity feedback signal 56 from the slave electric tachometer 58 is applied to the feedback summing junction 52 and the control signal 54 obtained by summing the inputs thereto is applied through suitable preamplifying and power amplifying means 60, 62, respectively as control signal 64 to the hydraulic servo valve 66 for regulating the advance of the slave metering plunger 18.

The slave system 28 has a plunger position potentiometer 68 that generates signals 70 representing slave plunger 18 position.

A gain control 61, 63 and limiter 65, 67 are connected to each of the master and slave loops, respectively. A position feedback summing junction 71, 73 is provided to each of the master and slave loops, respectively. A shot size reference signal source 74 is connectable to the summing junction 71 by switch means S1.

The velocity control signals for the FIG. 2 system are obtained preferably by liquid feed rate measuring means such as electric tachometers 41, 58 which are respectively associated with rack and pinion drives 43, 72 on the hydraulically driven metering plungers controlled by the FIG. 2 system. In similar and well-known fashion, potentiometers 45, 68 are each a distance measuring means driven by their respective rack and pinions to provide the requisite position feedback signals. These position signals are also used in the sequencing control system of FIG. 3 to manipulate switches S1-S10 and to start and stop the advance and retraction of the respective metering plungers as will be described elsewhere herein.

Supply, Metering, Valving and Mixing

FIG. 1 schematically illustrates the system 1 for feeding, metering, valving (note especially ball valves V1-V4 and pressure switches P1, P2) for controlling and mixing liquids. Where the system is for making polyurethane, isocyanate is fed into the master reservoir 5 through a supply line 75 and supply valve 76 from any suitable source such as a tank car, etc. The reservoir 5 is furnished with a supplemental pressurizing source 78 such as high pressure nitrogen supplied at a pressure of 3-5 psi. from any suitable source such as pressurized gas bottles, liquid nitrogen and vaporizer and pump, or the like.

The master metering cylinder system 17, 19 and the slave meter 19, 20 are preferably of the so-called lance design comprising a plunger that moves within a cylinder and has a substantial annular space, far greater than mechanical clearances, between the plunger and cylinder wall. Displacement from each cylinder is thus directly proportional to the volume displaced by the plunger when it is driven further into the cylinder or withdrawn from the cylinder. Furthermore, the plunger does not act to shut off the flow of liquids into the cylinders 19, 20 although the valves V1 – V4 are manipulated in the system to shut off flow through the respective metering cylinders at certain predetermined times.

In the master and slave metering systems respective pumps 25, 26 deliver liquid polyisocyanate and polyol from the respective reservoirs 5, 6 into the feed lines 79, 94 which contain valves V1 and V3. As explained below, the valves V1 and V3 are operated in unison with V2 and V4 and are closed when it is desired to prevent any liquid from entering their respective cylinders and are open at those times when liquid is to be pumped through the respective cylinders. In this manner, there is continuous circulation of the respective liquids through their respective metering cylinders and circuit except for those specific times when valves V1 and V3 are closed. Normally, valves V1 and V3 are closed when the system is undergoing prepressurizaton and injection but are open during shot preparation and cooling phases. This is shown in FIGS. 4a, 4b which illustrate the timing of the various events including operating V1 – V4.

Liquid, upon leaving each metering cylinder (which occurs as each plunger is driven from its illustrated retracted position at 82, 104 toward its extended position 81, 103) enters a mixing head feed line 84, 105 which each include a pressure switch P1, P2 respectively.

Each line 84, 105 directs liquid from its respective metering cylinder to the mixing head 10.

One of two events takes place at the mixing head: either the liquid is directed from the feed line 84, 105 into a mixing chamber 9 for contact with one or more other liquids (e.g. polyisocyanate is mixed with polyol) or the control elements V1 – V4 and plunger 121 prevent mixing and instead recirculate each liquid to its respective liquid reservoir 5, 6 through (for polyisocyanate) a recirculation line 85 – 106 that includes therein a control valve V2 (V4 for polyol) which is preferably a ball valve. A heat exchanger 86, 87 to control the temperature of the returned liquid reagent is preferably also located in each recirculating line.

It will be appreciated that the pumps 25, 96 pump an excess of liquid into their respective chambers 7, 8 until said chambers and conduits connected thereto are filled with liquid. The quantities of material (in chambers 7, 8 represents the volume that will ultimately be displaced when the plungers 17, 18 are advanced and which, therefore, are the quantities fed into the mixing head 10.

Preferred Mixing Head Construction

We did not invent the preferred embodiment of the mixing head 10. At the time of filing of the parent case hereof, the preferred mixing head was that as shown and described in Ser. No. 501,668, filed concurrently then by John Peter and issued on Oct. 14, 1975 as U.S. Pat. No. 3,912,234. The reader is referred to the aforesaid patent for structural details of the mixing head 10, which details are not needed here for an understanding of the method according to the present invention.

Operation and Automatic Controls

Referring first to FIGS. 1 and 3, the reader's attention is drawn to the following important control elements: control valves V1-V4; position indicating potentiometers 45, 68, on the respective metering cylinders for indicating the positions of the metering plungers 81, 82, and 103, 104 which are indicated by signals off potentiometers 45, 68; the mixing head potentiometer 150 for indicating plunger 121 positions shown as bottom 145, preinjection 146 and mixing 147 (FIG. 9 shows limit switches 145, 146, 147 for the same position indicators); pressure switches P1 and P2; and in FIG. 3 hold timer T1 and cooling timer T2. These in addition to the ratio control system of FIG. 2. All of these potentiometers (for position or distance) and likewise electrical tachometers 41, 58 and (mixing plunger) 153 are driven off rack and pinions 43, 72, 152.

The timing card of FIG. 4 shows when these various elements are enabled and disabled.

The plunger 121 has three positions indicated as 145, 146, 147 which respectively indicate first, slot blocking but fully advanced; second, partially retracted and still blocking the mixing slots; and third, fully retracted unblocking the mixing plates slots to permit mixing. These three positions are controlled by the automatic control system of FIGS. 3 and 4, explained below.

It should be understood that the several respective key potentiometer positions 81–147 inclusive can be realized by proximity or limit switches as well as by potentiometers. However, rack and pinion driven potentiometers are preferred for metering plungers 17, 18 and limit switches as in FIG. 9 are preferred for plunger 121 position — all are readily available commercial items.

The velocity signals required for the FIG. 2 system can be realized either from electric tachometers driven in unison with the position potentiometers or by computing from distance and time measurements.

The overall sequence has five major routines as further outlined on FIG. 4: shot preparation; prepressurization; injection; hold or pack; and cooling. This overall sequence as well as the sub-routines involved in each of the major operations is controlled by the sequence controller 3 illustrated schematically in FIG. 3. The sequence controller 3 may be of any commercially available type such as a Programmable Controller Model No. 184-1 manufactured by the Modicon Corporation of Andover, Mass. When the controller is energized by turning it on, it starts up the chemical and hydraulic pumps 25, 26 and 173 (FIGS. 1, 8) and initiates the shot preparation routine by closing switches S1 and S2 (FIGS. 2, 4) and applying, respectively, through S1 a reference signal representing a preselected shot size and via S2 a position signal, both to the position feedback summing junction 71.

Position ratio switch S3 is closed when switch S1 is closed so that position signal 48 can flow from the ratio means 31P to the slave position summing junction 73.

The various solenoid ball valves V1 through V4 are opened at this time.

Servo-valves 39, 66, and solenoid 200 (FIGS. 2, 8) control, respectively, the hydraulic fluid flow to the hydraulic piston and cylinder assemblies 21, 23; 22, 24; and the mixing head piston and cylinder 160, 161. The former two are caused to operate so that during shot preparation the master and slave plungers are both retracted fully to the solid line positions 82, 104 as illustrated in FIG. 1. At the same time, the mixing head plunger 121 is fully advanced to the position 145 (FIGS. 1, 5) whereby all of the mixing slots 125 are blocked by the plunger 121 the end of which preferably is flush with the mold face. While the mixing head plunger 121 is fully advanced to the position 145 (and also 146), all of the mixing slots 125 are blocked by the plunger 121 and therefore the recirculation path through the return ball valves V2, V4 to the reservoirs 5, 6 being open, the fluid flows through them continuously until the end of the shot preparation step at which time the prepressurizing step begins.

Prepressurizing brings the master and slave liquid systems up to certain threshold pressures before mixing and/or injection is allowed to take place. Simply stated, this involves controller 3 shutting off the recirculation paths by closing valves V1, V2, V3, V4 and then closing switches S5 and S6 (FIGS. 2, 4b) to apply the prepressurizing bias voltages 53, 55 to servovalves 39, 66 of the master and slave hydraulic cylinders to drive their plungers forward. During this interval since all paths are blocked by closed V1–V4 fluid pressure builds up until respective threshold pressures are reached at pressure switches P1 and P2 which closes P1 and P2 (FIG. 4). This signifies the master and slave liquids are now up to pressure and ready to be mixed and therefore the end of prepressurizing and beginning of injection. Prepressurizing also involves partially retracting the mixing head plunger 121 to the position 146: this still blocks the mixing slots but moves the plunger 121 to a position much closer to the slot-unblocking position, whereby an extremely short motion (to retracted position 147) and extremely short time will be required to unblock the slots 125 and initiate mixing.

With the mixing plunger 121 partially retracted and the system under pressure upstream and the pressure switches P1 and P2, the two pressure switches sense reaching threshold pressure and signal the end of prepressurizing and beginning of injection: the controller 3 responds to such threshold pressure signals fully and suddenly retracts the mixing plunger 121, which unblocks the ports 125 very rapidly and allows the two materials to come out through their slots, mixing intimately and reacting in the chamber 9. In the meantime, the plungers 17, 18 are advanced to feed their respective chemicals and they drive fully and rapidly to their most advanced in positions 81, 103 thereby metering selected volumes into the mixing chamber 9. As indicated on FIG. 4, the ball valves V1 – V4 are all closed at this time and the pressure switches P1, P2 have now disabled and will remain that way until the next prepressurizing step.

As can be appreciated, the mixing and injection steps are treated as one because they mainly involve getting the charges of material out of the master and slave cylinders 7, 8 into the mixing chamber 9 and then removing them from mixing chamber 9 by the rapid advance of the plunger 121 before those chemicals can cure or otherwise solidify. At the end of mixing operation controller 3 responds to plungers 17 and 18 reaching their full advanced positions 81 and 103 by driving the mix head plunger 121 from full retract 147 to its most advanced position 145. However, the plungers 17 and 18 are advanced at commanded injection rates for a fixed delay time after the plunger 121 closes the orifices 125 before stopping the movement of the plungers 17, 18. This improves the final mixing of the components. This signifies the end of injection.

Preferred operation requires closing orifices 125 completely with plunger 121 before plungers 17 and 18 are stopped. The excess liquids thus entering lines 84 and 105 are returned to reservoirs 5, 6 by the opening of pressure responsive relief valves R1 and R2 (FIG. 1) in response to the pressure buildup resulting from metering plungers 17, 18 overriding the closing of slots 125.

At this time, the hold routine is begun and the hold timer takes over and holds the plunger 121 at substantially that position for a predetermined period of time sufficient to maintain pressure on the reaction product to fill mold cavity 12 until the reaction products have solidified.

Then the cooling timer takes over on command of controller 3 to cool the now-molded article sufficiently to allow its removal from the mold and applies cooling water or the like to the mold assembly 11 so that the curing and hardening steps are thereby completed. Also, while the cooling timer is on, the system begins to reset itself by opening the various solenoid ball valves, retracting the metering plungers to positions 82, 104 and maintaining the plunger 121 in its advanced position 145. The system is then ready to repeat the shot preparation step, again under the overall guidance of the controller 3 and in parallel with the cooling phase.

Liquid Feeding Method

This method affords the advantage of maintaining full pressure and flow of the respective liquids during the entire time that any portion of any of the slots 125 is unblocked, i.e. during the time any liquid is being admitted into the mixing chamber 9. This is accomplished, generally speaking, by permitting the metering pumps 17, 19 and 18, 20 to continue to feed liquids even after the mixing plunger 121 has completely covered the axial slots 125. As noted above, the pressure relief valves R1, R2 between the respective metering pump outlets and reservoirs 5, 6 divert any excess liquid that is fed by this feature and avoid undesirable pressure surges in the conduits making up the system.

The method concerns feeding the inter-reactable liquids from their plural sources such as reservoirs 5, 6 to the mixing chamber 9 from whence the mixed liquids are injected into a mold cavity 12 (and to any associated runners and sprues, the term cavity being used to refer collectively to same as a matter of convenience). The reaction and curing of the liquid mixture is completed in the cavity.

More specifically, the method includes providing first and second positive displacement expandable chamber liquid metering pumps 17, 19 and 18, 20 filling the chamber 7, 8 of each respective pump with a predetermined quantity of liquid in excess of that moiety of each required to fill the cavity 12 with a reacting mixture from the mixing chamber 9 and establishing an open path 84, P1, 125 and 105, P2, 125 from the outlet of each metering pump to within the mixing chamber 9. The open path is established as noted above, by moving the mixing plunger 121 to its most retracted position 147 at which time the slots 125 are uncovered to the amount desired. If operation so requires, the slots 125 may be only partially uncovered by the plunger or alternatively they may be completely uncovered. This is a matter of adjusting the stroke of the plunger to the requirements of the system.

Once said completely open path has been established in response to the plunger 121 movement and the closing of the various valves V1 through V4, each liquid is fed from its respective metering pump through its path and out of the axial slots 125 into the chamber 9 until the aforesaid moiety of each liquid has entered the mixing chamber at which time a number of things occur: the mixing plunger 121 is advanced thereby covering the slots 125 and the feeding of the liquids into the mixing chamber ceases; the metering pumps at this point in time continue to feed their liquids (i.e. their plungers continue to advance) but since the liquids cannot enter the mixing chamber 9, pressures build up in the system causing the pressure responsive valves R1 and R2 to open thereby letting the excess liquid from each of the metering pumps return to its respective source 5, 6. The flow or recirculation of liquids to the source or reservoir 5, 6 continues until the respective plungers 17, 18 have fully advanced to 81, 103.

Meantime, the mixing plunger 121 continues to advance to the end of its stroke 145 thereby injecting into the cavity all of the admixed liquids that have entered the mixing chamber. These admixed liquids are in the course of reacting with each other and are composed of unreacted liquids, reacting liquids, and reaction products. Once all of the liquids have arrived in the cavity 12, a curing step is initiated in a manner well-known in the art by applying heat to the material in the cavity for a time sufficient to render the material solid and strong enough to permit its removal from the cavity at which time of course the mold is opened and the molding removed.

Ratio Control System Operation

During the injection and holding or packing steps of the system operation, the ratio control system of FIG. 2 operates to advance the metering cylinder plungers 17, 18 in unison to positions 81, 103 and force a quantity from each system into the mixer equal to the swept volume in the respective chambers 7, 9. The mixer 10 contemperaneously begins these with its plunger 121 at the mid or short stroke position but is promptly retracted fully to open the mixing slots when the threshold pressures are signalled by pressure switches P1, P2. When the mixing and injection steps begin, the switches S4A S4B, S5, S6 are closed and the reference velocity signal is fed forward into the master (isocyanate) feedback control system summing junction 32 and the velocity ratio controller 31V. At this time S1, S2, S7, S9 are open; S3 and S10 are closed. Reference signals from S4 through the ratio controller 31V begin advancing the slave control metering plunger by actuation of its hydraulic motor (for polyol) 22, 24. In the meantime, of course, the master plunger 17 is advanced. The mixing plunger 121 after both (1) full retract to position 147 and (2) after the metering plungers fully advance, moves sharply fully forward to 145 thereby to rapidly inject. Injection is at this point complete and holding begins.

While both metering plungers move through their strokes, the feedback control systems for each situation feedback their respective velocity signals 33, 56 from the electrical tachometers 41, 58. Corrections of the slave system are made by feeding back from the master system the plunger position or distance signal through the ratio controller 31P to the position summing junction 73 of the slave system.

The manner in which each hydraulic servosystem is manipulated, including the transducing of signals, is well-known and involves stepping up each electrical signal to a suitable power level, transducing it to a corresponding hydraulic signal in a hydraulic servovalve, and regulating the admission of hydraulic liquid into the hydraulic cylinder for the mixing head as further described below.

The control system of FIG. 2 is reset by opening switches S4, 5 and 10 and closing switches S2 and 9.

Reference switch S1 is also closed at the end of hold time to start preparing for the next shot to be injected.

The various switches, S1-10 are preferably relays the coils of which are energized by the controller 3.

Hydraulic System

FIG. 8 schematically illustrates the main components of the hydraulic system. The reagent metering cylinders 19, 20 and the mixing head 10 are shown at the top of the Fig. associated with their respective hydraulic cylinder and piston assemblies. In addition, the servo-valves 39, 66 for the master and slave systems (see FIG. 2) are illustrated with their hydraulic components in FIG. 8. The servo-valves 39, 66 are each three position variable flow valves which receive pressurized hydraulic liquid from a pump line 170 which is fitted with typical components such as filters 171, check valves 172. One or more constant volume supply pumps 173 deliver the liquid into line 170 from the sump or hydraulic liquid reservoir 175. The exhaust lines 177, 178 from or through the respective servovalves 39, 66 deliver exhaust liquid to the sump 175.

The three positions of the servovalves 39, 66 are to advance the hydraulic piston, hence the plungers 17, 18 as far as possible to the positions 81, 103; to the retract the hydraulic piston, hence the plungers 17, 18 as far as possible to the positions 82, 104; and to hold, by hydraulic means balancing the pressure on each side of the hydraulic piston in well-known fashion, at an intermediate position.

A solenoid valve 200 operates the mixing head 10 by moving the plunger thereof to the advanced position 145, to the intermediate position 146, and to the fully retracted and slot-unblocing position 147 in accordance with the sequence laid down by the monitor of FIG. 3. Solenoid valve 200 is a full flow three-position valve and preferably is pilot operated because of the extreme pressures and very rapid movements required in manipulating mixing plunger 121. Servovalve 200 is also preferably spring balanced whereby electrical failure or cut-off will return the valve, — hence plunger 121 — to the middle or intermediate position 146.

The operation of the hydraulic system should be self-evident: the pump delivers liquid under pressure to the servo-valves at a constant rate of supply. Inasmuch as the servo-valves are variable flow, and the pistons are double acting, excess liquid is returned to the sump 175 when the entire quantity is not called for by the position of the various servo-valves 39, 66, 200 and the components that they operate.

The system of FIG. 2 is the control system for servo-valves 39, 66 and connects them in master-slave fashion. The controller 3 sequences and resets the system.

Polyol as used herein means an organic compound containing two or more hydroxyl groups which is liquid under processing conditions and by polyisocyanate is meant an organic composition having two or more isocyanate groups and which is liquid under the processing conditions.

What is claimed is:

1. A method of automatically feeding interreactable liquids in a predetermined ratio from plural sources to a mixing chamber whence the mixed liquids are admitted into a mold cavity and any associated runners and sprues (hereafter called cavity) for completion of reaction and curing comprising the steps of:
   a. providing master and slave positive displacement expandable chamber liquid metering pumps each operated by a control system, the two systems being linked through a master slave ratio controller;
   b. filling the chamber of each pump, respectively with a predetermined quantity of liquid in excess of that moiety of said liquid required to fill said cavity with a reacting mixture from said mixing chamber;
   c. establishing an open path from the output of each pump to within said mixing chamber;
   d. feeding each respective liquid through its path and into said chamber from its respective pump until said moiety of each liquid has entered said mixing chamber;
   e. during said feeding adjusting slave pump feeding by a feedback control signal to said slave pump from said master pump through a controller representing a predetermined master/slave ratio of a condition of said master pump feeding; and
   f. blocking said open path and injecting admixed materials from said mixing chamber into said cavity.

2. The method of claim 1 wherein:
said mixing chamber is defined by an expandable chamber device having a plunger reciprocatable within a cylinder and said steps of establishing and blocking respectively include uncovering by a predetermined amount and completely covering axial slots in said cylinder walls by reciprocation of said plunger and further including the step of continuing to feed liquid out of each pump to said covered axial slot.

3. The method of claim 1 wherein said mixing chamber is defined by an expandable chamber device having a plunger reciprocable within a bore and said steps of establishing and blocking respectively include uncovering by a predetermined amount and completely covering axial slots in said bore walls by reciprocation of said plunger wherein said establishing is conducted by only partially uncovering said axial slots.

4. The method of feeding according to claim 1 wherein in said adjusting step (e) the condition of said master pump represented by said control signal is a slaved ratio of the position assumed by of said master metering pump.

5. The method of feeding according to claim 4 wherein the providing step further includes the control system for each of said master and slave pumps having a negative velocity feedback means and said feeding step additionally includes feeding back a signal representing the respective pump positive displacement velocity whereby each said control system is at least partly responsive by its respective negative feedback and likewise the liquids fed.

6. The method of feeding according to claim 1 wherein said adjusting step includes transmitting a control signal obtained from said ratio controller to a means for regulating the position of said slave pump, said control signal being a slaved ratio of the position assumed by said master pump.

* * * * *